United States Patent
Dieffenderfer et al.

(10) Patent No.: US 7,321,954 B2
(45) Date of Patent: Jan. 22, 2008

(54) METHOD FOR SOFTWARE CONTROLLABLE DYNAMICALLY LOCKABLE CACHE LINE REPLACEMENT SYSTEM

(75) Inventors: James N. Dieffenderfer, Apex, NC (US); Richard W. Doing, Raleigh, NC (US); Brian E. Frankel, Morrisville, NC (US); Kenichi Tsuchiya, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 255 days.

(21) Appl. No.: 10/915,982

(22) Filed: Aug. 11, 2004

(65) Prior Publication Data

US 2006/0036811 A1    Feb. 16, 2006

(51) Int. Cl.
*G06F 13/16* (2006.01)
*G06F 13/00* (2006.01)

(52) U.S. Cl. .............. 711/134; 711/133; 711/136; 711/160

(58) Field of Classification Search ............ 711/133, 711/134, 136, 160, 128
See application file for complete search history.

(56) References Cited

U.S. PATENT DOCUMENTS

| | | | | |
|---|---|---|---|---|
| 4,513,367 A | * | 4/1985 | Chan et al. ............ | 711/145 |
| 5,353,425 A | * | 10/1994 | Malamy et al. ........ | 711/144 |
| 6,047,358 A | * | 4/2000 | Jacobs ................... | 711/133 |
| 6,105,115 A | | 8/2000 | Mathews et al. | |
| 6,167,506 A | | 12/2000 | Witt | |
| 6,202,129 B1 | | 3/2001 | Palanca et al. | |
| 6,282,617 B1 | * | 8/2001 | Tirumala et al. ...... | 711/133 |
| 6,446,171 B1 | * | 9/2002 | Henriksen .............. | 711/136 |
| 6,594,742 B1 | * | 7/2003 | Ezra ....................... | 711/159 |

* cited by examiner

*Primary Examiner*—Hyung Sough
*Assistant Examiner*—Anton Rabovianski
(74) *Attorney, Agent, or Firm*—Connolly Bove Lodge & Hutz LLP

(57) ABSTRACT

An LRU array and method for tracking the accessing of lines of an associative cache. The most recently accessed lines of the cache are identified in the table, and cache lines can be blocked from being replaced. The LRU array contains a data array having a row of data representing each line of the associative cache, having a common address portion. A first set of data for the cache line identifies the relative age of the cache line for each way with respect to every other way. A second set of data identifies whether a line of one of the ways is not to be replaced. For cache line replacement, the cache controller will select the least recently accessed line using contents of the LRU array, considering the value of the first set of data, as well as the value of the second set of data indicating whether or not a way is locked. Updates to the LRU occur after each pre-fetch or fetch of a line or when it replaces another line in the cache memory.

12 Claims, 4 Drawing Sheets

METHOD FOR SOFTWARE CONTROLLABLE DYNAMICALLY LOCKABLE CACHE LINE REPLACEMENT SYSTEM

The present invention relates to computer processor memory caches such as a set associative cache. Specifically, a cache memory and method for controlling the cache memory is provided so that line replacement may be selectively controlled.

Computer processors use cache memories to reduce the access time for instructions as well as other data. Computer systems having a main memory containing all necessary instructions for executing an application suffer from execution delays because of the time needed to recover a necessary instruction from the mass memory. Accordingly, a cache memory is provided which permits the processor during a pre-fetch process to move instructions from the main memory to the cache memory where they may later be accessed when needed.

Even though cache memories speed up the access time for retrieving instructions, there still exists a disparity between the computer processor operational frequency and the access time for data to be stored in the cache. Cache designs, known as an L2 cache and a sum address decode L1 cache, which allow simultaneous access to a translation buffer (TLB) and an instruction or data cache, have been developed to reduce the void or idle time in processor execution due to the latency for a line fetch.

The design of cache memories must take into account the high clock speeds for the processors, which tend to increase the difference between instruction latency and instruction execution time, and are limited by the physical size of the memory. As an approach for maximizing cache memory performance while increasing the clock frequency, a 4-way set-associate cache may be optimum for certain applications. A 4- or 8-way set-associated cache has shown significant performance benefits without a complex output multiplexer circuit, and without a complex array for identifying which lines within a cache may be replaced. By set-associative, it is understood by those skilled in the art that a plurality of memories are addressed at the same time by a common address portion. The plurality of memories all map to a single cache line, and one of the cache lines from the set-associative memory is selected by a multiplexer using tag information accompanying the address. The set-associative cache stores only a portion of the instructions of a main memory which contains all the instructions needed for execution by the processor. During a pre-fetch operation (or any fetch operation), the processor must select certain lines for replacement so that new instructions are available in the cache for a subsequent execution cycle. Various algorithms have been implemented to select which of the lines are to be replaced. A commonly used replacement algorithm selects the least recently used (LRU) lines for replacement. In most cases, the replacement controller keeps track of cache line usages and replacement begins by selecting the cache line which has been least recently used for replacement.

However, even when employing this line replacement algorithm, there are cache lines such as processor instructions which are known to be frequently used and needed in the future, even though they may meet the replacement requirements of the LRU algorithm. Accordingly, it is desirable that such instructions, once identified, be immune to replacement and remain in the cache. The ability of the system programmer to lock out certain cache lines from replacement will avoid the problem of having instructions which are known to be needed at a later time from aging out of the cache. Since different applications may require different cache lines to be locked from replacement, therefore, the line selection process must be programmable and software controllable.

SUMMARY OF THE INVENTION

The invention provides a method for tracking the accessing of cache lines of an associated cache, and for locking certain cache lines from being replaced. An LRU array comprising a data array having a row of data representing each line in each way of the associative cache tracks the usage of each cache line. A first set of row data identifies the relative ages of cache lines for each associative cache set with respect to each other way. By examining the first set of data, it is possible to determine which of multiple ways in a set-associative cache contains the least recently used cache line, or, alternatively, the most recently used cache line. A second set of data associated with the first set of data identifies whether or not one or more of the cache lines are to be locked, and prevented from being replaced by a new cache line.

In accordance with a preferred embodiment of the invention, in a set-associative cache having 4-ways W0, W1, W2 and W3, the LRU array contents are updated after each access of a cache line by the cache controller. The first set of data contains six compare bits which identify the relative ages of cache lines, based on their most recent access with respect to the cache line having a common address in every other way. By examining the six data bits, W0W1, W0W2, W0W3, W1W2, W1W3 and W2W3, it is possible to determine which way contains the most and least recently accessed data. A second set of data identifies whether a particular cache line of one of the ways is not to be replaced. When a data bit of the second set of data is set to one, the identity of the particular cache line which is not to be replaced is identified to the cache controller.

DESCRIPTION OF THE PREFERRED EMBODIMENT

Figure 1:
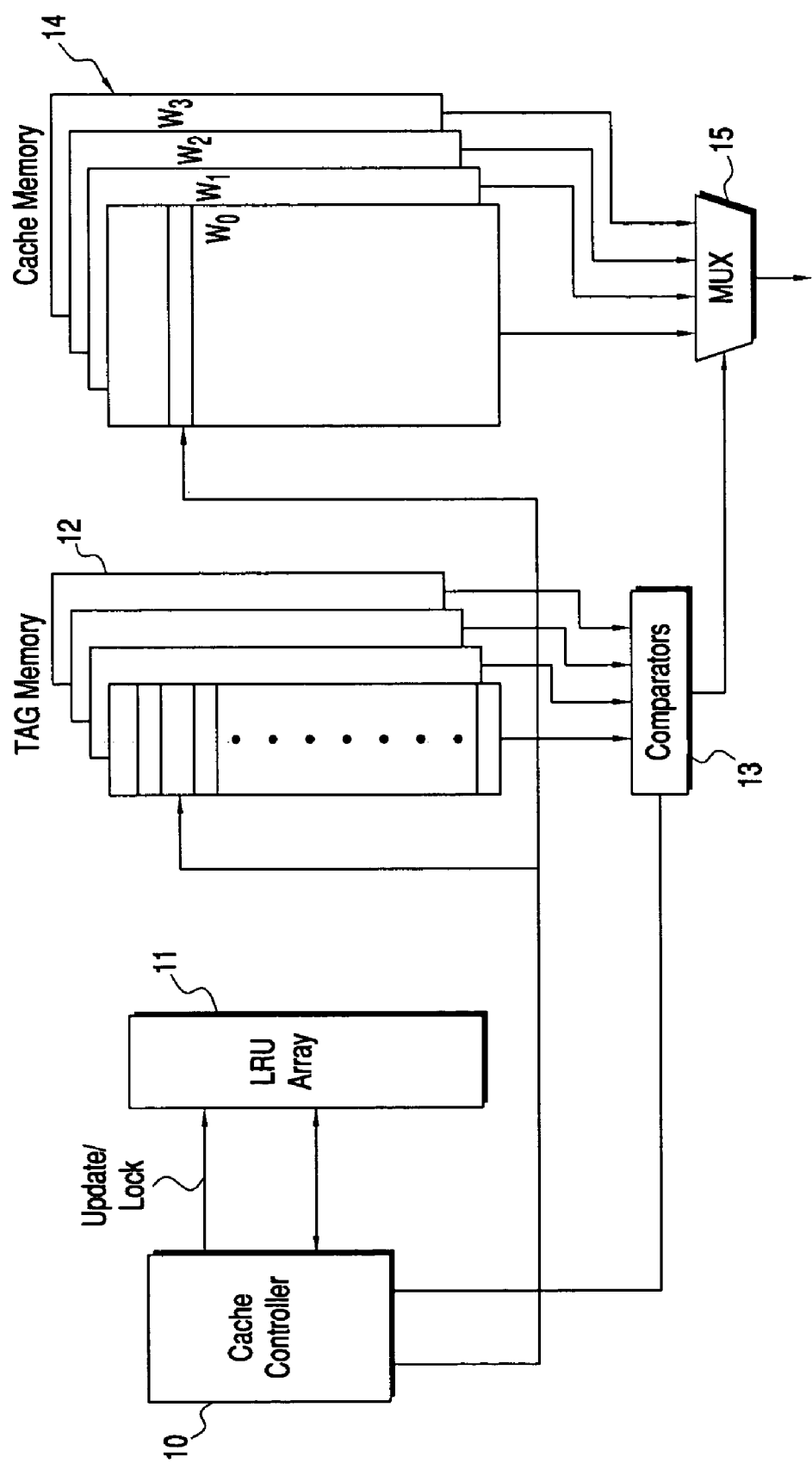
FIG. 1 is a block diagram illustrating the cache system which employs the LRU array method for accessing cache lines according to the present invention

Referring now to FIG. 1, there is shown a 4-way set-associative cache 14 under control of a cache controller 10. The set-associative cache includes ways W0, W1, W2 and W3, each set storing a line of data, such as instructions for execution by a processor. Each of the ways can include 256 lines of data, and each cache line produced from the set-associative cache 14 has a common address element so that four cache lines are addressed at once to produce a cache line of data from each of the ways W0, W1, W2 and W3.

One of these lines of data is selected by multiplexer 15 based on the output from a tag memory array 12.

The lower order portion of the address provided by the processor addresses each of four tag arrays in the tag memory 12 as well as the ways of the cache memory. The higher order portion of the address is presented to a comparator 13, and when the output of a tag array agrees with the higher order portion of the address, then a cache selection signal is produced for the multiplexer 15. Thus, only one line is selected from the four cache lines produced from the 4-way set-associative cache 14.

Figure 2:
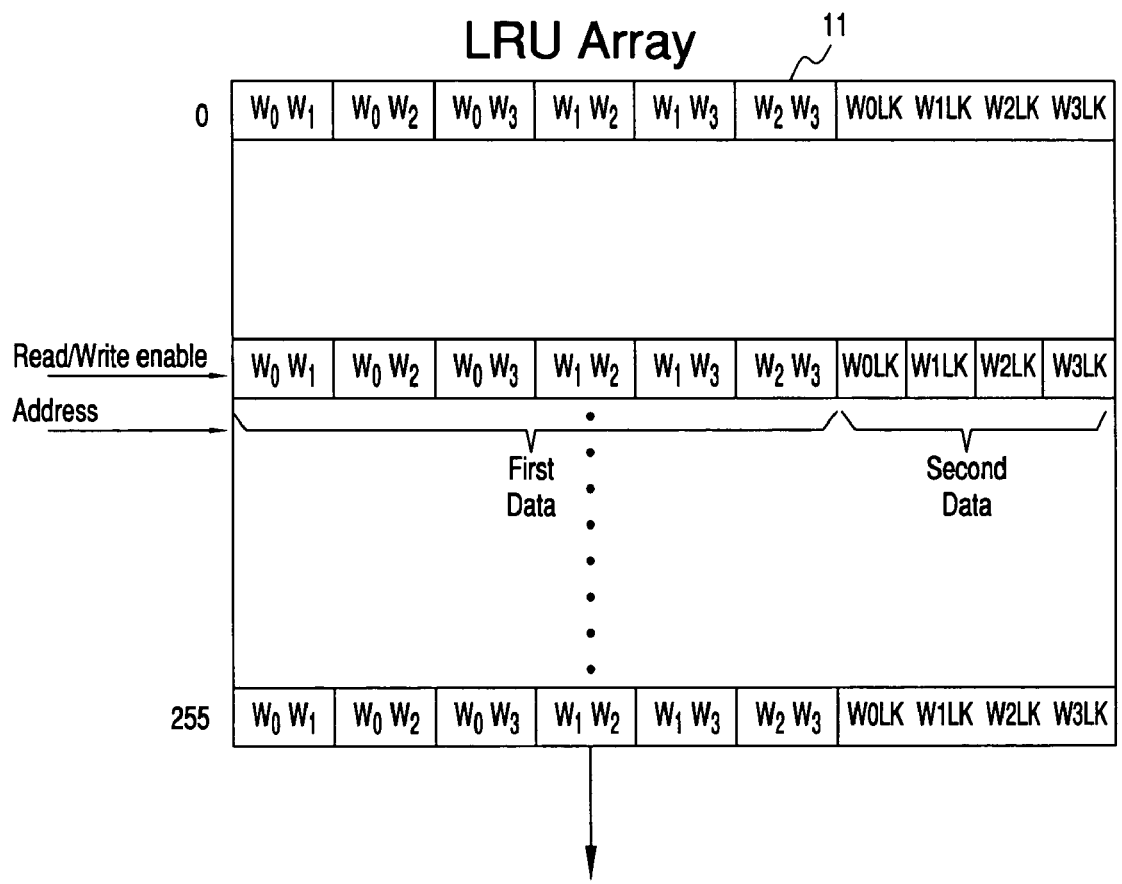
FIG. 2 illustrates an LRU array in accordance with a preferred embodiment of the invention for allowing the cache control unit to determine the least recently used line of a plurality of ways being addressed, as well as for locking a line of a way from being replaced.

Also as shown in FIG. 2, is an LRU array 11 which tracks the lines being accessed in the set-associative cache 14. As the set-associative cache 14 can only contain a minor number of instructions or data lines which may be needed for executing a program, the cache 14 requires updating so that new lines of data needed for execution are available. The LRU array 11 contains an up-to-date indication of which ways of the set-associative cache 14 contain the most recently used cache lines, as well as the least recently used cache lines which are preferred for replacement. The LRU array 11 is written with data every time an access occurs to a cache line in the cache 14, so that the cache controller 10 can identify which lines have been recently used, and which have not been recently used.

For each of the 256 sets contained in set-associative cache 14, there are six compare bits W0W1, W0W2, W0W3, W1W2, W1W3 and W2W3 in the LRU array 11. This first group of data comprise compare bits which identify the relative age of a respective cache line for each pair of ways. The first group, W0W1, is a compare bit which, when set to 1, indicates that the cache line W0 has been accessed more recently than that of way W1. When the bit is set to zero, W1 has been more recently accessed than W0. Correspondingly, the remaining pairs of ways have a compare bit W0W2, W0W3, W1W2, etc. which indicate the relative age of the second identified way with respect to the first identified way. The group of compare bits represent a first data group which identifies the exact LRU to MRU ordering for the plurality of ways, and identifies the way containing the least recently used cache line as well as the most recently used cache line.

A second group of data comprising four data bits identify which of the cache lines of a way may be locked. If one or more of the bits of the second data group are set, then the cache line of the locked way is identified as being excluded from replacement and does not get replaced. A comparison then takes place among the first data group of compare bits of the remaining ways which are subject to replacement, and the way containing the least recently used cache line is replaced.

The LRU array 11 of FIG. 2 is under constant revision as the cache controller accesses each of the lines in the cache 14. Thus, at any given time, the LRU array 11 contains up-to-date compare bits and locking bits to identify to the cache controller which lines may be replaced in the cache 14 to avoid a cache miss when subsequent instructions are fetched. In the event the cache 14 has not been pre-loaded with the appropriate instructions in a pre-fetch cycle, the system will then retrieve the instruction from the main memory which adds considerable delay in instruction execution.

Table 1 is shown illustrating the relative values of compare bits stored for each pair of ways for each cache line produced with a common address shown as the first data group. The six bits from the LRU array 11 identify the least recently used (LRU) way (when there are no locking bits set) from the following equations:

$lru\_Way0 = (\sim W0W1) \& (\sim W0W2) \& (\sim W0W3)$ $lru\_Way1 = (W0W1) \& (\sim W1W2) \& (\sim W1W3)$ $lru\_Way2 = (W0W2) \& (W1W2) \& (\sim W2W3)$ $lru\_Way3 = (W0W3) \& (W1W3) \& (W2W3)$

TABLE 1

| W0W1 | W0W2 | W0W3 | W1W2 | W1W3 | W2W3 | LRU Way |
|---|---|---|---|---|---|---|
| 0 | 0 | 0 | — | — | — | Way0 |
| 1 | — | — | 0 | 0 | — | Way1 |
| — | 1 | — | 1 | — | 0 | Way2 |
| — | — | 1 | — | 1 | 1 | Way3 |

Thus, when the least recently used cache line is in way 0, compare bits 0,0,0 are located in positions W0W1, W0W2, W0W3 of table 1. In accordance with above formulas. When ways W1, W2 or W3 contain the least recently used cache line, the data is in the form shown in Table 1.

As can be seen from the above, each time an access is made to a cache memory 14 line of data, the LRU data bits can be updated by changing only three of the compare bits. The remaining bits can be left alone. Each time a cache hit occurs, i.e., the cache produces the right data matching the address supplied by the processor, only three bits need to be written to the LRU to identify the way containing the accessed line as the most recently used way.

The present invention also provides for locking cache lines so that they do not become the least recently used and therefore replaced. The process treats locked lines as if they were the newest (most recently used) lines relative to the other cache lines of the other cache ways. In this way, a locked way is not considered for line replacement.

In order to provide for locking of a selected way, the equations are modified so that a way is not considered for line replacement when the lock bit is set. The modification of the above equations can be shown as follows:

$lru\_Way0 = (\sim mW0W1) \& (\sim mW0W2) \& (\sim mW0W3)$ $lru\_Way1 = (mW0W1) \& (\sim mW1W2) \& (\sim mW1W3)$ $lru\_Way2 = (mW0W2) \& (mW1W2) \& (\sim mW2W3)$ $lru\_Way3 = (mW0W3) \& (mW1W3) \& (mW2W3)$ $mW0W1 = (W0LK|W0W1) \& \sim W1LK;$ $mW0W2 = (W0LK|W0W2) \& \sim W2LK;$ $mW0W3 = (W0LK|W0W3) \& \sim W3LK;$ $mW1W2 = (W1LK|W1W2) \& \sim W2LK;$ $mW1W3 = (W1LK|W1W3) \& \sim W3LK;$ $mW2W3 = (W2LK|W2W3) \& \sim W3LK;$ where: mW0W1=modified age of Way0/Way1
WnLK=Wayn is locked; where n=0,1,2,3

Figure 3:
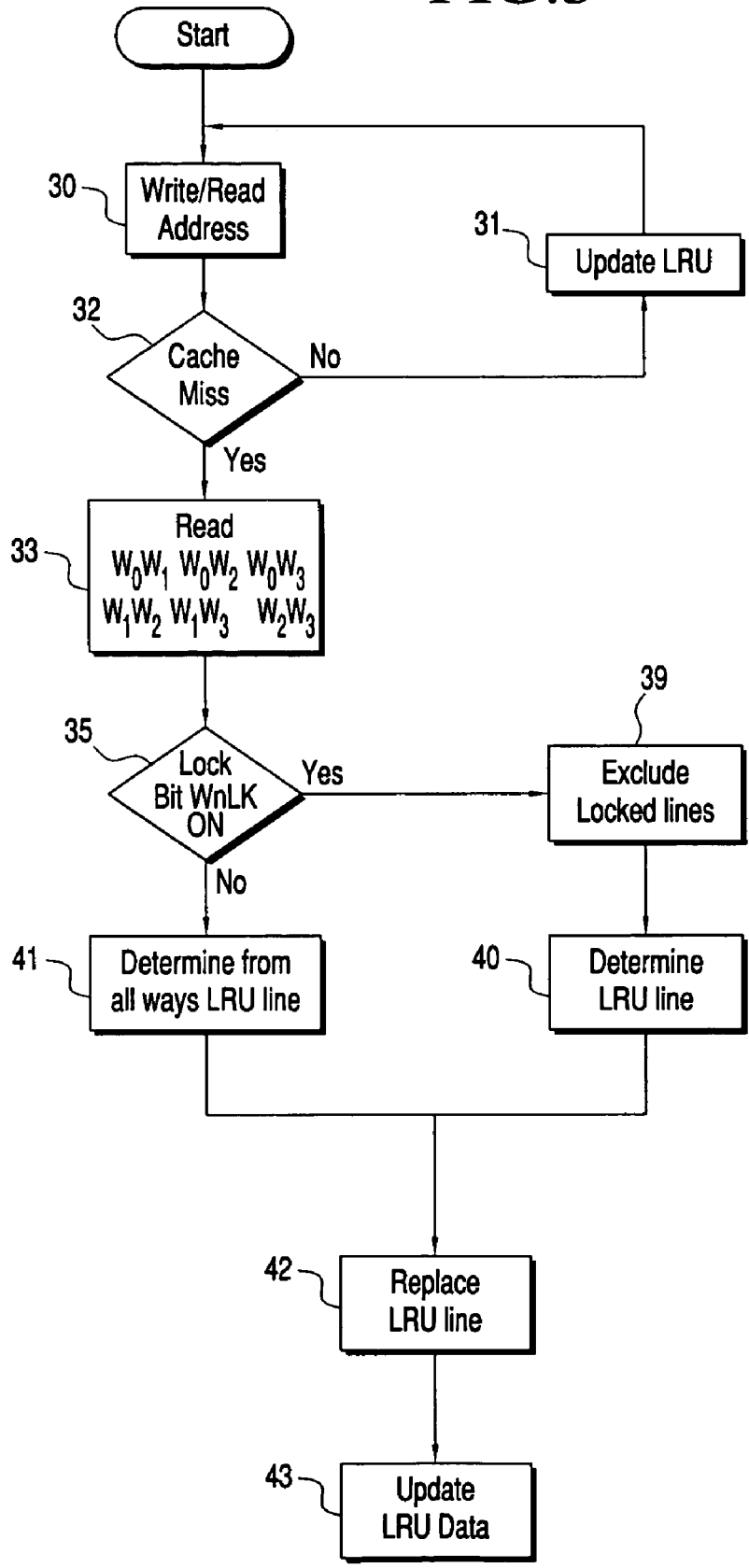
FIG. 3 is a flow-chart illustrating how the cache control unit of FIG. 1 controls replacement of cache lines in the 4-way set-associative cache 14.

The process for tracking usage of the cache lines and identifying lines for replacement, which are not locked, based on their lack of use, is shown more particularly in FIG. 3. The process begins each time the cache controller addresses a line in cache 14 in step 30. The address which has been used to read or write data from or to the cache 14 is also used by the processor to update each of the compare bits of the LRU 11 in step 31. The LRU compare bits are written as shown in Table 2 to identify the particular way producing the most recently accessed lines of the cache. If the processor has executed a pre-fetch instruction, wherein instructions which will be needed for executing the application program are identified, a line in the cache is selected for replacement at the address specified by the processor. When the cache controller receives a request to replace a cache line, due to a cache miss as determined in decision block 32, the compare bits stored at the selected address will be read and analyzed in step 33. According to the data in Table 1, the data identifies the cache line which is least recently used in step 41 when no lock bits have been set. The cache controller 10 can then replace the line in step 42, and the LRU data is updated in step 43 and is identified as the most recently used line. Table 2 identifies how the LRU data is to be set when a cache line is replaced or reused. For instance, if the cache line of way 2 is most recently updated or used, the compare bits for W2 are written as shown to indicate they are most recently used.

TABLE 2

| WAY to make MRU | WOW1 | WOW2 | WOW3 | W1W2 | W1W3 | W2W3 |
|---|---|---|---|---|---|---|
| Way0 | 1 | 1 | 1 | — | — | — |
| Way1 | 0 | — | — | 1 | 1 | — |
| Way2 | — | 0 | — | 0 | — | 1 |
| Way3 | — | — | 0 | — | 0 | 0 |

("—" represents a don't touch bit)

If a lock bit for one or more lines has been turned on in the examined set of the LRU array by a software executed command under control of the programmer as determined in step 35, the cache line for replacement is identified by the modified equations.

The least recently used line is determined in step 40 by examining all of the compare bits of Table 1 excluding the particular way or ways which are identified as locked. The least recently used line is selected from the remaining ways in step 40, and the line is replaced in step 42. The LRU data is updated in step 43 to change the status of the line from least recently used to most recently used. In the event there are no lock bits set to 1, then a determination is made from all the ways which is the least recently used line by referring to the contents of the compare bits of Table 1.

Table 3 illustrates how the locked bits are utilized to identify the ways which are locked, and force the locked way to appear as having the most recently used line.

determine the cache line to be replaced. The remaining three lines of Table 3 illustrate the replacement determination when Way1 is locked. Lines are locked and unlocked using CPU instructions.

Figure 4:
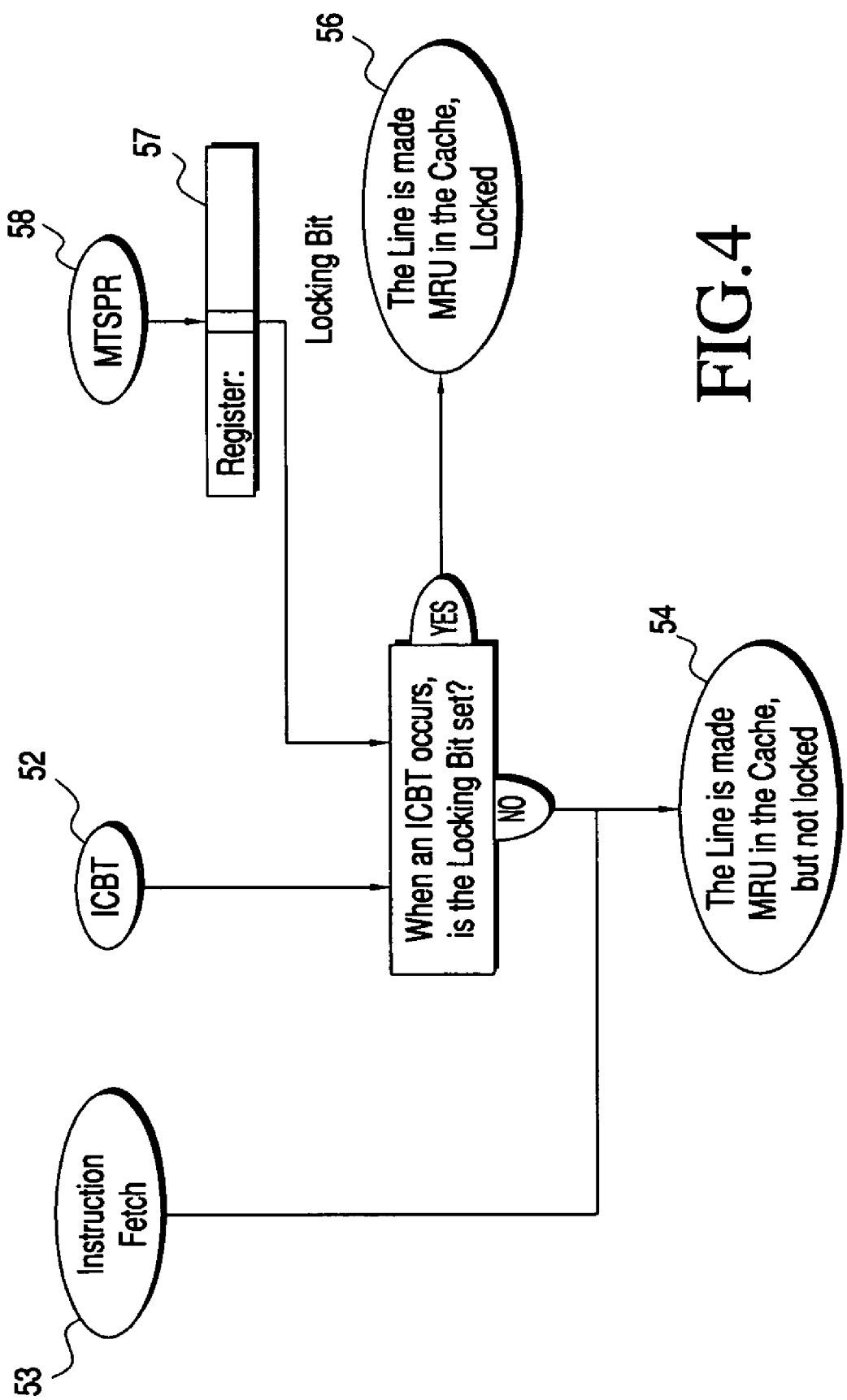
FIG. 4 illustrates the process for locking and unlocking a cache line.

The execution steps to lock a cache line are illustrated in FIG. 4. Before an ICBT (instruction cache block touch) event occurs, such as writing a pre-fetch and replacement line in the cache, a Move to Special Register (MTSPR) instruction 58 is executed and a global locking bit is set in a cache control register 57. The setting of the cache control register 57 means that one or more cache lines in the cache are to be locked. The addresses of the locked lines are identified in the ICBT instructions contained in the software. Thus, when the cache is addressed by ICBT instruction 52, the line in the LRU is locked in step 56 by writing 1 for the lock bit in the appropriate LRU array 11 location. During a normal instruction fetch, an instruction is fetched in step 53 from the cache memory, the line is made the most recently used line in the cache, and is not locked as shown in step 54.

Locked lines can be unlocked by executing an instruction to invalidate the entire I-cache lock bits and turn off all the locked bits at once. Alternatively, an ICBI (instruction cache block invalidate) instruction may be executed to unlock only the line addressed by the ICBI instruction, and is identified as invalid. The invalid line is therefore LRU and subject to replacement.

While the invention has been particularly shown and described with reference to preferred embodiments thereof, it will be understood by those skilled in the art that various changes in form and details may be made therein without departing from the spirit and scope of the invention.

What is claimed:

1. A method for tracking the accessing of lines of an associative cache for selecting a line to be considered a least recently used line (LRU), the method comprising:
   storing, for each line first data corresponding to each of said lines in an LRU memory array having a common address portion,
   said first data including a plurality of fields, each of said fields containing a bit identifying a relative age of a cache line in a pair of ways, said first data thereby identifying which way of a pair is a least recently used (LRU) cache line; and
   storing second data in association with said first data, wherein said second data includes cache line lock

TABLE 3

| WOW1 | WOW2 | WOW3 | W1W2 | W1W3 | W2W3 | W0LK | W1LK | W2LK | W3LK | LRU WAY |
|---|---|---|---|---|---|---|---|---|---|---|
| — | — | — | 0 | 0 | — | 1 | 0 | 0 | 0 | Way1 |
| — | — | — | 1 | — | 0 | 1 | 0 | 0 | 0 | Way2 |
| — | — | — | 1 | 1 | 1 | 0 | 0 | 0 | 0 | Way3 |
| — | 0 | 0 | — | — | 0 | 1 | 0 | 0 | 0 | Way0 |
| — | 1 | — | — | 0 | 0 | 1 | 0 | 0 | 0 | Way2 |
| — | — | 1 | — | — | 1 | 0 | 1 | 0 | 0 | Way3 |

The first three lines show Way0 is locked because of the presence of a locked bit. Since Way0 is locked at the LRU address, the cache line it is not to be replaced so the equations above will make it appear to be the most recently used. It is only the relationship between the remaining three ways which do not have a lock bit set, which are used to information for selectively identifying whether cache lines for any of a plurality of ways are to be prevented from replacement; and processing said first data and not said second data to select a line for replacement when said second data indicates no line is prevented from replacement and processing said first and second data to select a line for replacement when said second data indicates at least one line is prevented from replacement, said processing allowing replacement of only a single line when all lines, are prevented from replacement.

2. The method of claim 1, further comprising:
updating said first data when an access to a cache line occurs to identify a most recently accessed way.

3. The method of claim 2, wherein said second data modifies said first data so that a way which is to be locked against replacement of a cache line is not identified as a least recently accessed way.

4. The method according to claim 1 wherein said second data is written by an instruction executed by a processor identifying a way having a cache line prevented from replacement.

5. The method according to claim 1 wherein said second data is cleared by an instruction which identifies only a single locked cache line.

6. The method according to claim 1 wherein for each of said ways, W0, W1, . . . , WN, wherein N is a total number of ways, said first data includes a data bit indicating, for every pair of ways, a relative age of access of the cache line in the pair, and
wherein said second data comprises N bits associated with each of said ways, W0, W1, . . . , WN, said N bits indicate whether cache lines for each of a plurality of ways are to be prevented from replacement with new data.

7. The method according to claim 6 wherein there are 4 ways, W0,W1,W2,W3, and six data bits representing the relative age of each pair of ways W0W1,W0W2,W0W3, W1W2,W1W3, and W2W3 from which the least recently used way may be identified, and 4 data bits associated with said 4 ways to indicate ways that are to be prevented from replacement with new data.

8. The method according to claim 1 further comprising:
selecting a way for replacing a cache line from the ways which do not have a lock bit associated therewith.

9. The method according to claim 8 wherein said selected way is the least recently used among said ways which are not locked.

10. The method of claim 1 wherein said processing employs a set of equations, with one equation for each said cache line way, where when said first and second data is used, a term in said equation representing a relative age of a cache line way is modified to account for prevention of replacement of either way.

11. The method of claim 10 wherein selecting a Way 0, of Ways 0-3, for replacement is determined from (~W0W1)&(~W0W2)&(~W0W3) where no line is prevented from replacement and from (~mW0W1)&(~mW0W2)&(~mW0W3), where at least one line is prevented from replacement, where
W0W1 is a bit which represents which of Way 0 or Way 1 is older,
W0W2 is a bit which represents which of Way 0 or Way 2 is older,
W0W3 is a bit which represents which of Way 0 or Way 3 is older, $mW0W1=(W0LK|W0W1)\&\sim W1LK$ $mW0W2=(W0LK|W0W2)\&\sim W2LK$ $mW0W3=(W0LK|W0W3)\&\sim W3LK$ where:
~represents logical NOT or an inverting function,
|represents logical OR function,
& represents logical AND function,
W0LK is a bit which represents Way 0 prevented from replacement,
W1LK is a bit which represents Way 1 prevented from replacement
W2LK is a bit which represents Way 2 prevented from replacement, and
W3LK is a bit which represents Way 3 prevented from replacement.

12. The method of claim 10 where selection of any of Ways 0 through 3 for replacement is determined from:

Way $0=(\sim mW0W1)\&(\sim mW0W2)\&(\sim mW0W3)$

Way $1=(mW0W1)\&(\sim mW1W2)\&(\sim mW1W3)$

Way $2=(mW0W2)\&(mW1W2)\&(mW2W3)$

Way $3=(mW0W3)\&(mW1W3)\&(mW2W3)$, where

W0W1 is a bit which represents which of Way 0 or Way 1 is older,
W0W2 is a bit which represents which of Way 0 or Way 2 is older,
W0W3 is a bit which represents which of Way 0 or Way 3 is older,
W1W2 is a bit which represents which of Way 1 or Way 2 is older,
W1W3 is a bit which represents which of Way 1 or Way 3 is older,
W2W3 is a bit which represents which of Way 2 or Way 3 is older, $mW0W1=(W0LK|W0W1)\&/W1LK$ $mW0W2=(W0LK|W0W2)\&/W2LK$ $mW0W3=(W0LK|W0W3)\&/W3LK$ $mW1W2=(W1LK|W1W2)\&/W2LK$ $mW1W3=(W1LK|W1W3)\&/W3LK$ $mW2W3=(W2LK|W2W3)\&/W3LK$ where:
W0LK is a bit which represents Way 0 being prevented from replacement,
WiLK is a bit which represents Way 1 being prevented from replacement
W2LK is a bit which represents Way 2 being prevented from replacement,
W3LK is a bit which represents Way 3 being prevented from replacement,
~represents logical NOT function or inverting function,
| represents logical OR function, and
& represents logical AND function.

* * * * *